Feb. 24, 1959 R. W. COURSEY 2,874,857
PARKING SYSTEM
Filed Aug. 23, 1957 7 Sheets-Sheet 1

R. W. COURSEY 2,874,857

PARKING SYSTEM

Filed Aug. 23, 1957

INVENTOR
R. W. Coursey
by Jerry J. Dunlap
ATTORNEY

FIGURE 5

Feb. 24, 1959   R. W. COURSEY   2,874,857
PARKING SYSTEM

Filed Aug. 23, 1957   7 Sheets-Sheet 4

FIGURE 10

Feb. 24, 1959 R. W. COURSEY 2,874,857
PARKING SYSTEM
Filed Aug. 23, 1957 7 Sheets-Sheet 7

FIGURE 12

INVENTOR R. W. Coursey
ATTORNEY Jerry T. Dunlap

United States Patent Office 2,874,857
Patented Feb. 24, 1959

2,874,857

PARKING SYSTEM

Ralph W. Coursey, Oklahoma City, Okla.

Application August 23, 1957, Serial No. 679,934

4 Claims. (Cl. 214—16.1)

This invention relates to improvements in storage systems particularly adapted for the parking of automobiles in congested areas.

At the present time, there are two principal types of automatic parking systems in use. In each system, the automobiles are parked in super-imposed levels somewhat similar to the floor levels of a manually operated parking hotel or the like. At each floor level are provided a series of aisles or vacant spaces for movement of automobiles being parked and unparked, and a series of stalls or parking spaces on each side of each aisle. Therefore, approximately one third of the area at each floor level is retained vacant to permit movement of the automobiles during parking and unparking operations. In one type of system, an automobile to be parked is driven onto an elevating system and raised vertically to the desired aisle of the desired floor level. The automobile is then transferred to a horizontally moving system to move the automobile along the particular aisle until it is in a position opposite the desired parking space. Finally, the automobile is moved off of the horizontal moving system into the parking space. The unparking operation is the reverse. In this type system, the automobiles are raised and lowered at only one point in each aisle and then moved along the aisle in the desired direction for the parking operation.

In the second system, the automobiles are moved vertically to the desired aisle at the desired floor level by an elevating system which is capable of lifting the automobiles and positioning the automobiles at any point in the aisle. In other words, the elevating system is a combination vertically and transversely movable mechanism to properly position the automobile in the desired aisle. The automobile is then transferred into a stall adjacent the aisle.

In each of the above systems, the automobile is ordinarily moved a substantial distance transversely as well as vertically for a parking or unparking operation. As a result, and as mentioned above, a large proportion of the available area at each floor level must be maintained vacant for the transverse movement of the automobiles. In addition, the automobiles are transferred from a carriage to a stationary stall or from one carriage to another during the parking and unparking manipulations at the elevated floor levels, thereby providing a great number of opportunities for an automobile to be damaged.

The present invention contemplates a parking system utilizing a plurality of super-imposed floor levels, or parking areas, wherein the maximum available space at each floor level is used for the storage of automobiles. Each floor level of a commercial installation comprises a plurality of sets of parallel horizontal tracks arranged in closely adjacent side-by-side relation for the reception of a series of automobile supporting carriages in end-to-end relation on each set of tracks. A series of separate elevating systems intersect each set of horizontal tracks to move the automobiles vertically onto the set of tracks at a plurality of points. Therefore, a carriage can be moved vertically off of its set of tracks at a point in close proximity with the storage position of the carriage. When a carriage above the first floor level is to be lowered, the carriages directly below this carriage in the lower floor levels are moved along their respective tracks to provide an opening through which the carriage to be moved is lowered. Thus, only an area at each floor level equal to the area of a single aisle in the previously described systems must be left vacant. It will be understood that such vacant areas will not be necessary for the top floor level of a system built in accordance with the present invention. In my system, the automobiles are driven onto a supporting carriage at the lower level of a storage system and are elevated and parked in the same carriage. In other words, the carriage is moved vertically and then horizontally to the desired parking position, thereby eliminating the necessity of transferring the automobile from the carriage at an elevated position, with the consequent elimination of the dangers involved.

An important object of this invention is to provide an automatic parking system wherein the maximum available area may be used for parking automobiles.

Another object of this invention is to provide an automatic parking system requiring a simple control system.

A further object of this invention is to provide an automatic parking system wherein automobiles may be parked and unparked in a minimum of time.

Another object of this invention is to provide an automatic parking system wherein the automobiles are transported and parked in individual carriages and the automobiles are not removed from the carriages, except at ground level at the discharge end of the system.

A still further object of this invention is to minimize the horizontal movement of automobiles being parked and unparked in an automatic parking system.

Another object of this invention is to provide a simply constructed automatic parking system which may be economically manufactured and operated.

Other objects and advantages of the invention will be evident from the following detailed description, when read in conjunction with the accompanying drawings which illustrate my invention.

Figures 2, 4A:
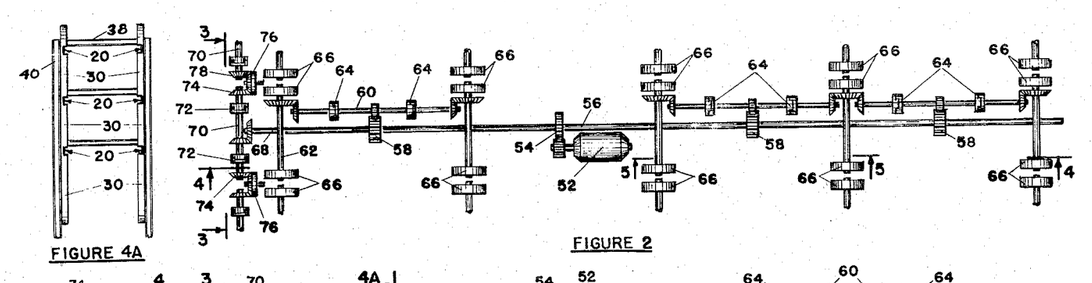
Figure 2 is a plan view of the upper portion of the drive system used for moving the automobile supporting carriages.
Figure 4A is a sectional view of a system as taken along lines 4A—4A of Figure 4, showing only the arrangement of the supporting tracks.
Figure 4:
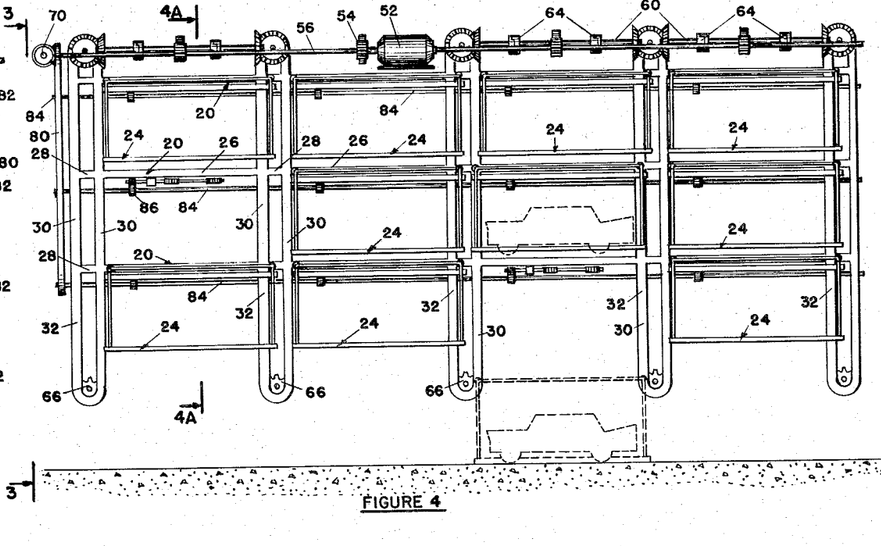
Figure 4 is a sectional view as taken along lines 4—4 of Figure 3.

Referring to the drawings in detail, and particularly Figs. 4 and 4A, reference character 20 generally designates a plurality of sets of horizontal carriage supporting tracks arranged in vertically spaced relation. Each set of tracks 20 forms what may be considered a floor level, and for purposes of illustration, I have shown only three such sets. It will be understood that any number of sets of tracks may be used to provide a parking system of any desired height and number of floor levels. It will be further understood that a commercial parking installation would utilize a plurality of columns or rows of the sets of tracks 20 in side-by-side relation, whereby each floor level of the installation would comprise a plurality of sets of tracks 20 arranged in closely spaced side-by-side relation. Unless otherwise indicated, the phrase "parking system" as used in the present specification and claims shall refer to a single row or column of sets of tracks 20.

Figure 8:
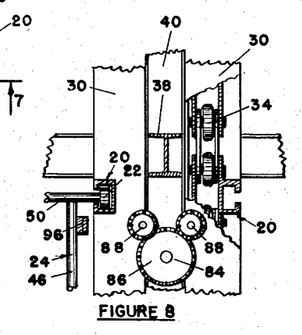
Figure 8 is a sectional view as taken along lines 8—8 of Figure 6.

As shown most clearly in Figure 8, each track 20 is generally C-shaped in cross section to receive the rollers 22 of the automobile supporting carriages, generally designated at 24, as will be more fully hereinafter set forth. The tracks of each set are arranged in opposed relation and are supported in parallel relation at the same height throughout the length of the system. Each track 20 (see Fig. 4) is constructed in long and short sections, 26 and 28 respectively, with the short and long sections being alternately arranged in spaced end-to-end relation. The adjacent ends of the various sections 26 and 28 are interconnected by a vertically extending roller guide 30 to receive the carriage rollers 22 and permit vertical movement of the carriages 24 at a plurality of points along each set of tracks, as will be more fully hereinafter set forth. The roller guides 30 at the opposite ends of each short track section 28 are connected at their upper and lower ends to provide a vertically extending loop 32 at each end of each of the longer track sections 26.

Figure 6:
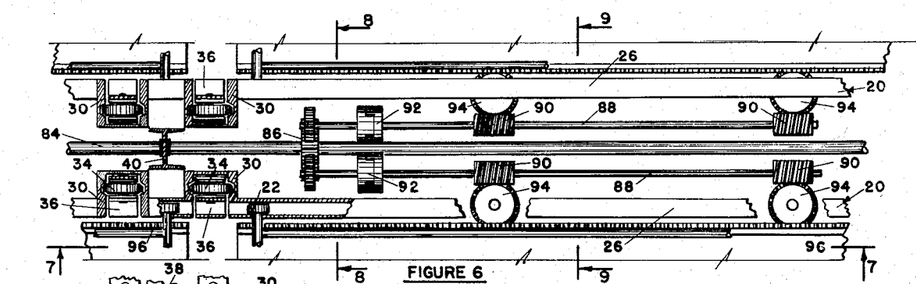
Figure 6 is an enlarged sectional view as taken along lines 6—6 of Figure 5.
Figure 7:
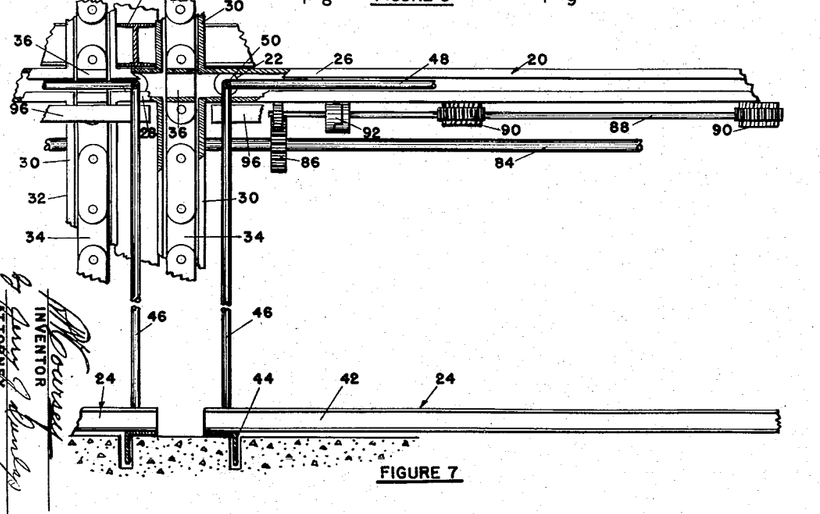
Figure 7 is a sectional view as taken along lines 7—7 of Figure 6.

Each guide 30 is channel-shaped in cross section, as illustrated in Figs. 6 and 7, and is interconnected with the adjacent ends of the track sections 26 and 28 in such a manner to provide a continuation of the tracks 20. That is, the sides of each guide 30 are cut-away at the intersection of the guide and the track sections 26 and 28, whereby the carriage rollers 22 may move freely in a horizontal direction from one track section to an adjacent track section. A continuous or endless chain 34 is slidingly secured in any desired manner in each guide loop 32, thereby extending vertically through the respective roller guides 30. The chains 34 form the elevating mechanisms for raising and lowering the carriages 24, and for this purpose, each chain 34 has series of channel shaped steps 36 secured in spaced relation thereon. The steps 36 are constructed to receive the rollers 22 and, when properly positioned, form continuations of the tracks 20 between the various sections 26 and 28 for the support of the carriage rollers 22 during movement of the rollers between the track sections. The steps 36 are secured on the chains 34 a distance apart equal to the vertical spacing between the tracks 20 . Thus, when any step 36 is aligned with one of the tracks 20, the remaining steps 36 on the particular chain 34 will be aligned with the remainder of the tracks 20 intersected by the particular guide loop 32.

The rectangular arrangement of the tracks 20 and guide loops 32 lends itself to simple support of these members. The supporting structure may be constructed in any desired manner, so long as the tracks 20 are sufficiently rigid to support a plurality of the automobile storage carriages 24. For example, (see Figs. 6–9) I-beams 38 may be extended horizontally between the guide portions 30 of each guide loop 32, and vertical beams 40 extended between adjacent guide loops 32 of adjacent parking systems.

Figure 3:
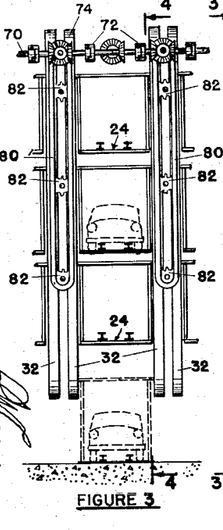
Figure 3 is an end elevational view of a one column parking system and a portion of two adjacent systems.
Figure 9:
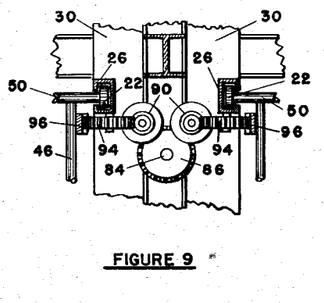
Figure 9 is a sectional view as taken along lines 9—9 of Figure 6.

Each automobile supporting carriage 24 comprises a pair of longitudinally extending I-beams 42 interconnected at their opposite ends by cross-braces 44 as illustrated in Fig. 7. The I-beams 42 are spaced to contact the under carriage of an automobile on the opposite sides of the automobile drive shaft as illustrated in Figure 3. Thus, when a carriage 24 is raised up into contact with an automobile, the wheels of the automobile will extend below the I-beams 42 and the automobile will be securely supported on the I-beams, without danger of the automobile rolling off of the carriage 24. A pair of vertical bars 46 (Fig. 7) are secured to each cross member 44 to extend upwardly on the opposite sides of the carriage 24. The bars 46 are spaced apart a distance greater than the width of any conventional automobile. The upper ends of the bars 46 are interconnected by longitudinally extending bars 48 and transversely extending bars 50. The bars 50 extend outwardly beyond the bars 46, as illustrated in Figs. 8 and 9, to receive the carriage rollers 22. It will thus be seen that a set of the rollers 22 is provided at each end of each carriage 24.

As previously indicated, the rollers 22 of each set are spaced apart to ride in a pair of the tracks 20 for movement of the carriage 24 lengthwise along the parking system. It is also to be noted that the sets of rollers 22 for each carriage 24 are spaced apart a distance slightly greater than the length of each of the longer track sections 26, whereby when the rollers 22 at one end of a track section 26 are disposed within the guide 30 at the respective end of the track section, the opposite set of rollers 22 of the carriage are positioned in the guide 30 at the opposite end of the respective track section 26. Thus, when a carriage 24 is positioned centrally with respect to a track section 26, it may be moved vertically in the system. Functionally speaking, therefore, the guides 30 at the opposite ends of each track section 26 may be considered as a pair of guides for the raising and lowering of the carriages.

The elevating chains 34 may be driven, and the carriages 24 moved longitudinally along the tracks 20, by a power unit in the form of a reversible electric motor 52 positioned at the top center of the system, as illustrated in Figs. 2 and 4.

The motor 52 is suitably mounted on the supporting structure (not shown) and is connected by gears 54 to a longitudinally extending control shaft 56 located at the top and extending lengthwise of the parking system. The control shaft 56, as well as the various drive and control shafts to be described below, is suitably supported by bearings (not shown) on the supporting structure for the tracks 20 and guides 30. A plurality of gears 58 are secured in longitudinally spaced relation on the control shaft 56 to drive the elevating chains 34 disposed in the loop guides 32. Each gear 58 drives a stub shaft 60 secured in parallel relation with the control shaft 56, and each stub shaft 60 is in turn geared to a pair of transversely extending shafts 62. It will also be observed that a clutch 64 is interposed in each stub shaft 60 between the respective gear 58 and each of the transverse shafts 62.

Each shaft 62 drives a sprocket 66 on each end thereof. The sprockets 66 are mounted in the tops of the guide loops 32 to mesh with and drive the elevating chains 34. It will be apparent that a transverse shaft 62 is provided for each transversely opposed set of guide loops 32, and that a sufficient number of gears 58, stub shafts 60 and clutches 64 are provided to drive each transverse shaft 62 independently. The controls for the clutches 64, as well as the main drive motor 52 will be hereinafter described. It will be observed, however, that adjacent shafts 62 are driven in opposite directions by virtue of the gear connections between the stub shafts 60 and the shafts 62. Therefore, the chains 34 in longitudinally adjacent loops 32 will be driven in opposite directions to provide movement of the chains 34 in the roller guides 30 at the opposite ends of each of the longer track sections 26 in the same direction, which may be either up or down. It will also be apparent that the various gears 58 connecting the control shaft 56 to each of the shafts 62 are of uniform size to provide the same speed of movement for each of the elevating chains 34.

One end 68 of the control shaft 56 extends beyond the adjacent outer-most guide loops 32 and is geared to a transversely extending control shaft 70. The shaft 70 is connected by clutches 72 and gears 74 to sprockets 76 positioned on each side of the parking system being described. Additional gears 78 may be engaged with the gears 74 to drive an additional shaft 70 at each side of the parking system being described for the operation of additional parking systems in a complete commercial installation, if desired. Each sprocket 76 drives an endless chain (not shown) extending downwardly along the end of the parking system through a loop-shaped chain guide 80 as shown in Figs. 3 and 4. Each of the chains in the guides 80 in turn drives a sprocket 82 at each floor level of the parking system. The sprockets 82 are secured on the ends of horizontally extending shafts 84 which are positioned to the outer side of and slightly below each horizontal track 20. The shafts 84 are parallel with the tracks 20. It will also be observed that when each of the sprockets 76 at the ends of the transverse shaft 70 is driven, all of the horizontal shafts 84 positioned below the respective sprockets 76 will be rotated simultaneously.

The shafts 84 are utilized to drive the carriages 24 along the horizontal tracks 20. To this end, I provide a gear 86 on each horizontal shaft 84 opposite the longer sections 26 of each adjacent track 20. Each gear 86 drives a stub shaft 88, as is most clearly shown in Figs. 6 and 7. When two or more parking systems are used, each gear 86 between the systems may be used to drive two of the stub shafts 88, as illustrated in Fig. 6. A pair of worm gears 90 are secured on each stub shaft 88 in spaced relation, and a clutch 92 is interposed in each shaft 88 between the driving gear 86 and the adjacent worm gear 90. The worm gears 90 are positioned intermediate the ends of each longer track section 26, and each worm gear 90 engages a ring gear 94 rotatably secured to the under side of the adjacent track section 26. The gears 94 in turn engage racks 96 secured to the vertical bars 46 of the automobile supporting carriages 24.

Each rack 96 is of a length substantially equal to the length of the respective carriage 24, and the gears 94 are spaced such that when a carriage 24 is being moved along a particular set of tracks 20, the rack will be engaged by a gear 94 at the track section 26 toward which the carriage is being moved prior to the time the closest gear 94 on the track section 26 from which the carriage is being moved is disengaged from the rack. Therefore, a carriage 24 may be positively driven throughout the entire length of any set of tracks 20. In the present embodiment, a rack 96 is secured on each side of each carriage 24 to provide a driving force on both sides of each carriage when the carriage is being moved horizontally along the tracks 20. It will be apparent, however, that only a single rack 96 would be sufficient for driving a carriage in many installations.

Mechanical operation

The main drive motor 52 and the various clutches 64, 72 and 92 are independently controlled to provide the desired carriage movement. These elements may be conveniently controlled by an electrical system which will be described in detail below. At this point, however, it is well to review and analyze the various carriage movements and positions. The detailed operation of the main motor 52 and the various clutches will be described in connection with the electrical system.

Figure 5:
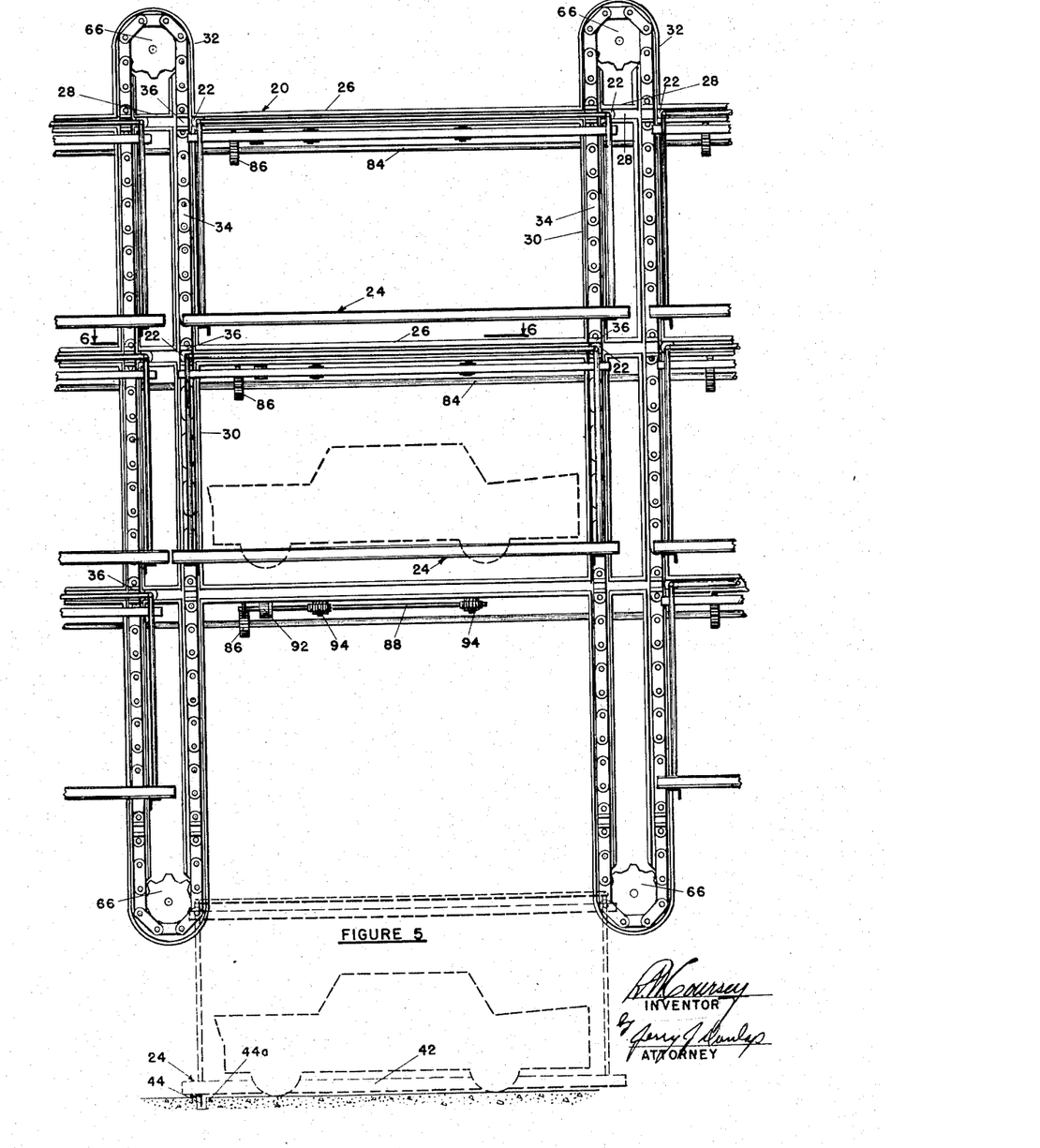
Figure 5 is an enlarged sectional view, similar to Figure 4, illustrating the operation of an elevating mechanism used for raising and lowering the automobile storage carriages.

Figure 5 best illustrates the main carriage positions in my system. The upper carriage 24 (shown at the third floor level) typifies the base parking or home position of the carriages. It will be observed that the rollers 22 of this carriage are supported in the respective set of tracks 20 in close proximity with a pair of the guides 30. One set of rollers 22 are in the end portions of a pair of larger track sections 26 and the other set of rollers 22 are disposed in the shorter track sections 28 beyond the opposite ends of the respective larger track sections 26. In this position of the carriage 24, the carriage is not affected by movement of the adjacent elevating chains 34, yet the carriage need be moved only a very short distance in a horizontal direction to enter the roller guides 30 and driving chains 34 for a vertical movement of the carriage. As previously indicated, this position of the carriage 24 is typical of the base or home position for the carriages and the position to which each carriage 24 is moved in a parking operation.

The carriage 24 at the second floor level in Figure 5 is in a typical position for vertical movement of the carriages. It will be observed that the rollers 22 at one end of the carriage are disposed in the steps 36 of the driving chains 34 at one end of a pair of the larger track sections 26; whereas the rollers 22 at the opposite end of the carriage are disposed in the steps 36 of the chains 34 at the opposite ends of the respective large track sections 26. Thus, the carriage 24 will be raised or lowered by movement of the respective chains 34. As previously indicated, the longitudinally adjacent drive chains 34 are driven in opposite directions, thereby providing uniform movement for the portions of the chain 34 in the guides 30 at the opposite ends of each larger track section 26. It may also be noted that the chains 34 are stopped in such positions that the various steps 36 are aligned with the tracks 20. Therefore, a carriage 24 in the position shown at the second floor level may also be moved along the respective tracks 20, as, for example, to the home position as illustrated at the third floor level and as previously described.

The position of each carriage 24 when driving an automobile onto or off of the carriage is illustrated in dotted lines at the bottom of Figure 5. The carriage 24 is, of course, moved to and from this position by the respective elevating chains 34 where an automobile may be removed from the carriage or placed on the carriage. This position of the carriage 24 is well below the tracks 20 at the first floor level of the system in order that automobiles may be driven underneath carriages on the first floor level without fear of damage to the parked automobiles. It will also be observed that the cross-members 44 of the carriage 24 enter slots or trenches 44A in the floor of a building housing the system in order that the I-beams 42 may be lowered from the under carriage of the automobile and automobiles driven onto or off of the carriage.

Figure 4 illustrates the operation of a single parking system having three floor levels. It will be observed that the tracks 20 in the third, or upper, floor level are completely occupied by carriages 24. That is, a carriage 24 is positioned in each parking position available at the upper floor level. However, one parking space must be left vacant on the first and second floor levels to permit horizontal movement of the carriages on these levels for parking and unparking automobiles in the second and third floor levels. For example, when it is desired to unpark the automobile shown in dotted lines at the second floor level in Figure 4, the carriages 24 on the first floor level are moved along the respective tracks 20 until the space below the car being unparked is clear. The carriage 24 containing the car to be unparked is then lowered by the respective elevating chains 34 to the dotted line position of the carriage as shown at the bottom of the figure.

When the automobile is replaced in the carriage at the unparking position, the carriage is then raised back to the second floor level and moved along the respective tracks 20 by operation of the gears 94 (Figs. 6 and 9) engaging the respective racks 96 until the carriage reaches its normal park position. The two carriages 24 on the first floor level at the left hand end of the system shown in Figure 4 are then moved to the right a distance equal to the distance between normal parking spaces to their normal parking positions. If manual control of the system were feasible, the last two carriages mentioned above could be left in the positions shown in Figure 4, however, with an automatic control system it is desirable that each carriage 24 have a home position to which the carriage is moved following a parking operation. Therefore, the carriages are moved along the tracks 20 on the first floor level to their original positions, leaving vacant parking spaces at the left hand end of the first and second floor levels. It may also be observed that regardless of the length of the system, only a single space at each floor level equal to a space occupied by a carriage 24 (except the top floor level) need be left vacant. The carriages at the lower floor levels may then be moved a sufficient distance to provide clearance for carriages in the upper floor levels.

Figure 1:
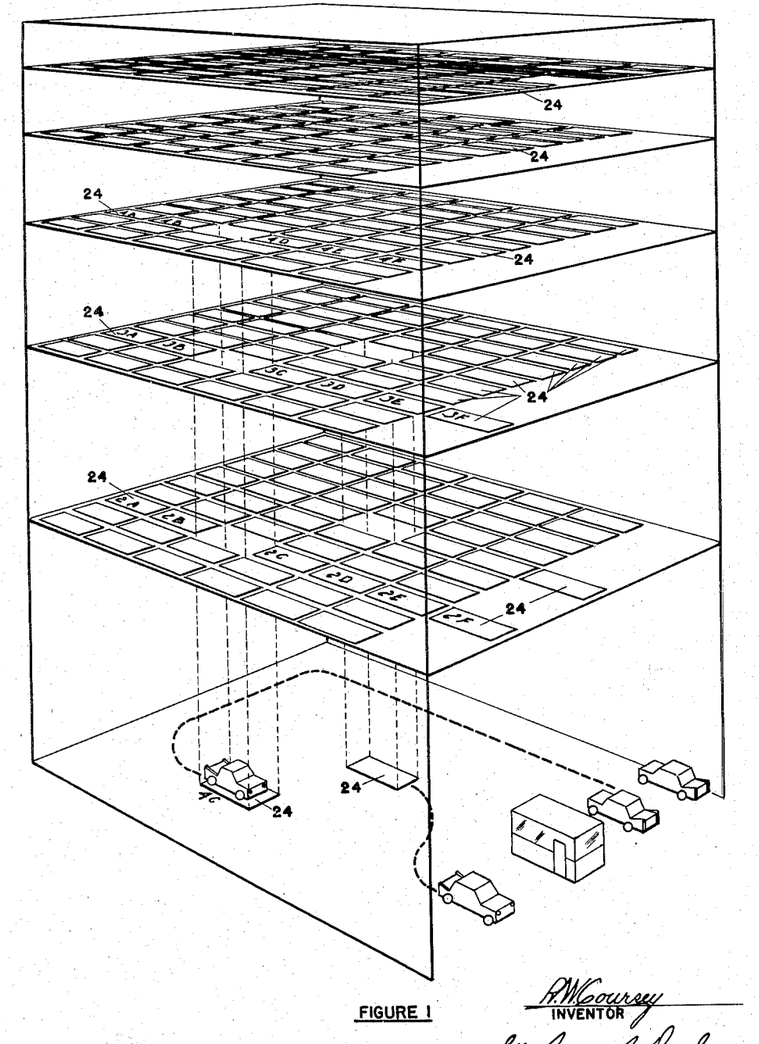
Figure 1 is a schematic perspective view of a commercial installation of my parking systems illustrating movement of the automobile supporting carriages during a parking or unparking operation.

The movements of several carriages may best be illustrated by a commercial installation using a plurality of the present systems arranged in side-by-side relation. Such an arrangement is diagrammatically shown in Figure 1. It will be observed that a vacant space is left on each floor level (except the top floor level) in each of the separate parking systems of a size sufficient to receive a carriage. In operation of this type of installation, assume that it is desired to unpark the automobile from the carriage 24 in position 4C at the fourth floor level. Before this carriage can be moved downward, spaces must be provided through the third and second floor levels immediately below the carriage. Therefore, the carriages in positions 3C through 3F at the third floor level are moved to the right one parking position, and the carriages in positions 2C through 2F at the lower floor level are similarly moved. The carriage at 4C may then be moved freely downward to the unparking position as illustrated. Upon return of the carriage to its 4C position at the fourth floor level, the carriages at 3C to 3F and 2C through 2F are returned to their normal positions in line with the carriages in adjacent systems of the installation. With this multiple type of installation, an automobile may be parked or unparked from each of the systems at the same time if desired, thereby providing the maximum speed in parking and unparking in a commercial parking installation.

Control system

Although I have shown the drive system for the carriages 24 as being by the use of a plurality of clutch operated shafts from the main motor 52, it will be understood by those skilled in the art that separate drive motors (not shown) could be provided for each carriage (for horizontal movement of the carriages) and for each elevating chain 34 for vertical movement of the carriages. However, the system shown is very effective and lends itself to accurate electrical, automatic control by the use of electrically controlled clutches for initiating movements of the carriages, and limit switches for stopping the carriages, as described below.

In general, the clutches 64, 72 and 92 and the motor 52 are controlled by relays, with the relays in turn being controlled by limit switches. The various limit switches may be installed on stationary portions of the system and contacted by the carriages, thereby eliminating the necessity of using sliding contacts on the carriages. Parking or unparking may be easily initiated by push buttons located convenient for the operator of the system. The control circuits are arranged so that after the push button contact is made to start either the park or unpark sequence, contacts of relays operated by the limit switches control the necessary sequence of carriage movements. These contacts are so placed in series or multiple with the coils of the operating relays that all limit switches must have completed their duty before the next step in the sequence can start, thereby reducing the possibility of the automobiles being knocked together.

Figure 10:
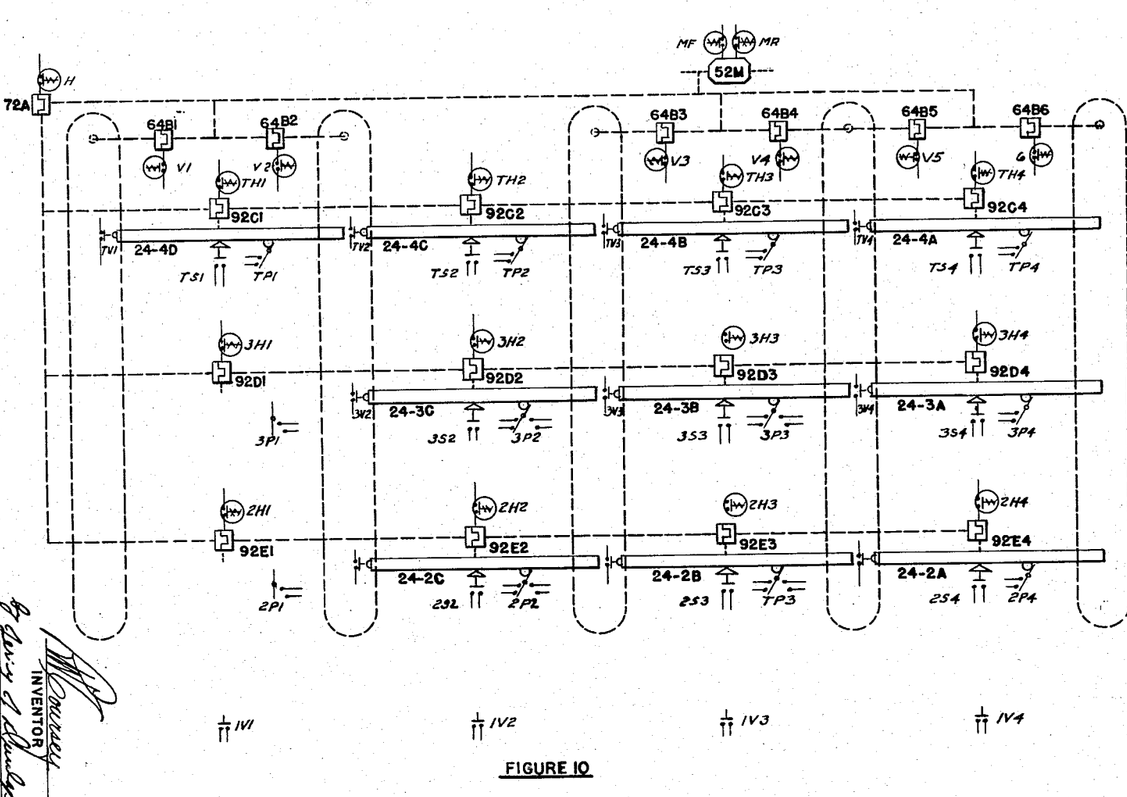
Figure 10 is a diagrammatic layout of the switches and relays for controlling movement of the carriages.
Figure 11:
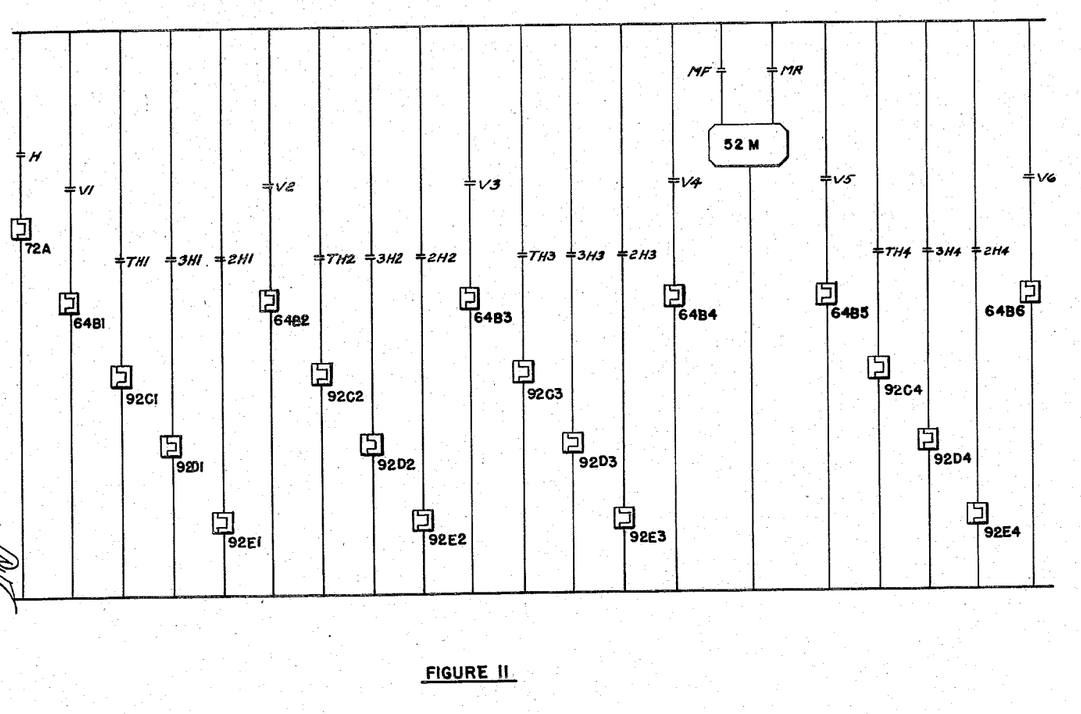
Figure 11 is a schematic electrical diagram showing the electrically operated clutches and motor, and the relay contacts which operate these units.
Figure 12:
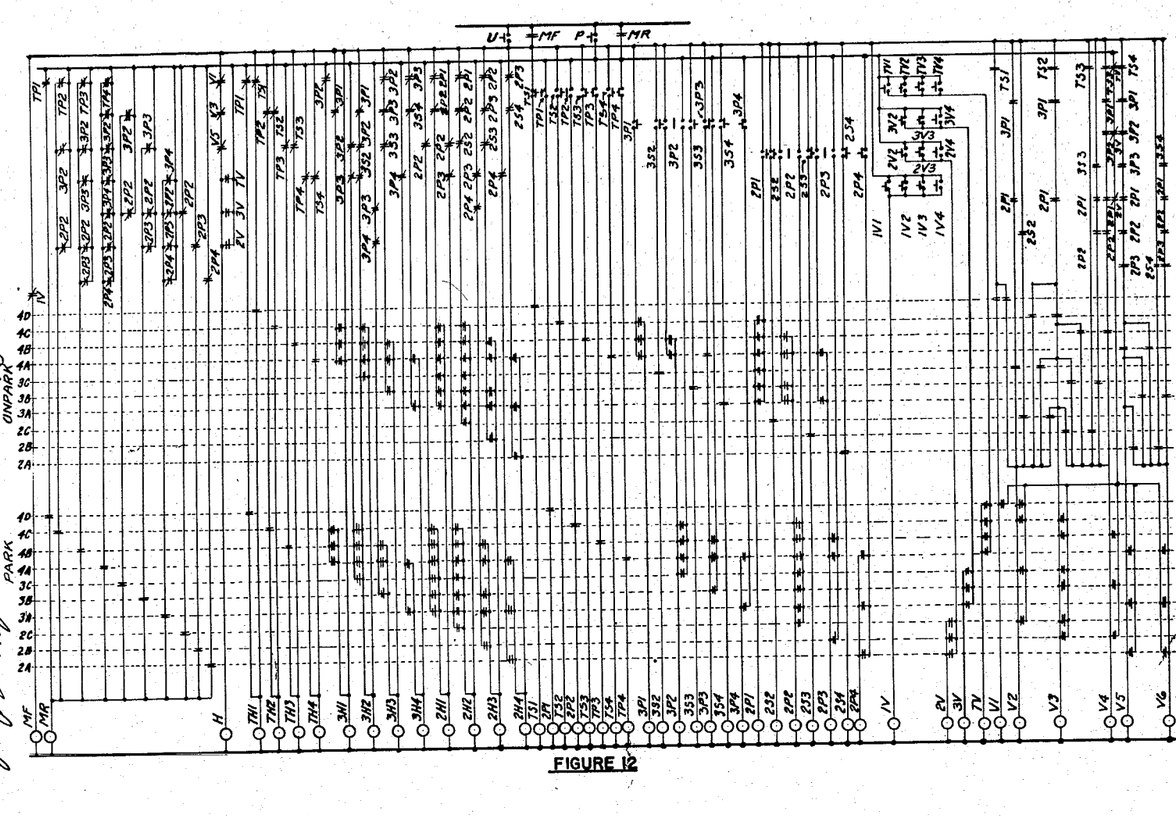
Figure 12 is a schematic wiring diagram of the complete control system.

In Figures 10, 11 and 12, and in describing the electrical control system, I have given the carriages 24 and clutches 64, 72 and 92 additional identifying symbols to facilitate the description of the specific operations performed. The general reference characters previously used herein have been retained, and additional letters and numbers have been added after the general reference characters, usually with a dash between the main reference character and the added letters and numbers.

Referring to Figure 12 it will be noted that each relay is designated by a combination of numerals and letters. The left hand number or letter refers to the floor level and the right hand number to the vertical shaft numbered from left to right as they appear in the drawings. The letter in the middle refers to the relay function. The "M" relays are associated with the main motor, the "H" relays with carriage horizontal movement, "V" relays (without a floor level number on the left) are associated with the vertical movement of the carriages, and the "S" relays with stopping carriage horizontal movement preparatory to vertical travel downward. The "P" relays are associated with stopping carriage horizontal movement in base positions or one full position to the left of base position, and the "V" relays (without right hand numeral) are associated with stopping vertical travel at the ground or other floor levels.

Each carriage has a punched card associated with it and each card has a group of slots arranged to close the proper circuits to complete an unparking operation when the unpark button contact is made, as well as a group of slots arranged to close the proper circuits to complete a parking operation when the park button contact is made. This is shown by the dotted lines of Figure 12; all contacts being closed along a dotted line when the card associated with the carriage number shown at left end of dotted line is inserted.

With this general explanation the operation can better be shown by following through from Figure 12 the sequence of a typical operation. To unpark, say carriage 24—4B, after inserting punch card 4B, we first close contact "U." This energizes relay MF through the normally closed contact IV and the MF contacts immediately seal across the push button U energizing the unpark control bus at the top and also closing the MF contacts shown on Figure 11 starting the main motor in the proper direction. Now following the dotted line designated by 4B and "Unpark" on Figure 12, it is noted that the punch card slots have closed circuits to main horizontal drive relay "H," and relays starting the horizontal movement of carriage 24—4B and carriages directly below and below to the left of 24—4B on the 3rd and 2nd floors (TH3, 3H1, 3H2, 3H3, 2H1, 2H2 and 2H3). They have also closed the circuit to limit switch relay TS3 that will stop the horizontal movement of 24—4B when it arrives in the vertical travel position, as well as to the limit switch relays 3P1, 3P2, 2P1 and 2P1 which stop the lower carriages' horizontal movement when they are in proper position to clear the vertical shaft for the downward travel of 24—4B carriage. Two more contacts have been closed that energize the vertical travel relays V3 and V4 that serve to start the vertical drive in the proper shaft to lower carriage 24—4B.

Now that these circuits have been closed, the following sequence takes place:

"H" relay starts the horizontal movement drive shafts on all floors, TH3 relay stars the horizontal movement of 24—4B carriage, 3H1, 3H2 and 3H3 starts the horizontal movement of carriages 24—3C and 24—3B and 2H1, 2H2 and 2H3 starts the horizontal movement of carriages 24—2C and 24—2B.

When each moving carriage arrives in proper location the limit switches close relays TS3, 3P1, 3P2, 2P1 and 2P2 stopping each carriage independently.

It will be noted that the contacts of the five limit switch relays are in series in the circuit supplying vertical travel relay V4 and must all have closed to energize relay V4; in other words all carriages must have stopped their horizontal movement and be in the proper position. When V4 is energized it will be noted that the circuit has a back feed through the punch card contact to also energize V3 relay.

Carriage 24—4B is now traveling downward and continues to do so until a limit switch "1V3" at the ground floor operates to close the circuit to relay IV.

The normally closed contacts of IV in the MF relay circuit now open, deenergizing relay MF, breaking the MF contact seal and opening the MF contacts to the main motor (Fig. 11). 24—4B carriage is now in the unpark position and the system is deenergized and at a standstill.

Now to move 24—4B carriage to the park position, insert the same 4B punched card and close contact "P" to energize relay MF through the 4B punched card contact. MR contacts immediately seal across the "P" switch to close the circuit to the park control bus and close the reverse direction circuit to the motor (Figure 11).

Now following the dotted line designated by 4B and "Park" on Figure 12, it is noted that the punched card slots have closed circuits to relays TH3, 3H1, 3H2, 3H3, 2H1, 2H2 and 2H3 that are to move the carriages displaced by the unpark operation horizontally back to their home position. However, the carriages cannot move until the drive shafts to which they have been coupled start turning, which in turn must wait on operation of "H" relay (see Figure 10). Other circuits closed by the punched card slots are those to the limit switch relays TP3, 3P2, 2P2 and 2P3. Note that these are the home position limit switch relays of the displaced carriages and that these relays are held open by positions of the limit switches. The other three circuits closed by the punch card slots are the top level limit switch relay TV and the vertical movement relays V3 and V4.

Now that the 4B punched card circuits have been defined, the parking operation sequence for carriage 24—4B can be described. Relays V3 and V4 being energized through some normally closed contacts initiate the upward movement of carriage 24—4B. When 24—4B carriage arrives at its home floor (top), it closes limit switch TV3, energizing relay TV. The normally closed contacts of relay TV open to deenergize relays V3 and V4 stopping the carriage at the top floor level. Another contact of the TV relays closes the circuit to relay "H." This mechanically couples the main horizontal drive mechanism to the motor. It will be recalled that the displaced carriages have already been coupled, and the energization of relay H starts simultaneous movement of all displaced carriages horizontally toward their home where they are stopped by "P" limit switches which also stop the main motor.

From the foregoing it will be apparent that the present invention provides an automatic parking system utilizing the maximum available space and wherein automobiles may be parked and unparked in a minimum of time. The top floor level of a system in accordance with this invention may be completely occupied by parked automobiles, and only one parking space must be left vacant in each of the lower floor levels. The automobiles are parked in areas closely adjacent to the locations at which they are raised, thereby minimizing horizontal movement and speeding up the operations. It will also be seen that the automobiles are retained in their individual carriages during the complete parking and unparking operations, and the system is easily adapted to automatic electrical control. The system is simple in construction and may be economically manufactured and operated.

Changes may be made in the combination and arrangement of parts or elements heretofore set forth in the specification and shown in the drawings, it being understood that changes may be made in the precise embodiment shown without departing from the spirit and scope of the invention as defined in the following claims.

I claim:

1. A parking system, comprising a plurality of carriages, a set of rollers carried by and extending outward from each end portion of each carriage, a plurality of vertically spaced sets of horizontal tracks for receiving said rollers and movably supporting a plurality of the carriages in end-to-end relation on each set of tracks, a vertical roller guide means interconnected with the adjacent ends of each vertical row of horizontal tracks, there being a guide means connected to each end of each track, additional guide means intersecting each vertical row of tracks, each of said guide means being in the form of a vertically extending loop to provide two vertically extending roller guideways at each guide means location, said guide means being spaced along the lengths of the tracks such that the distance between adjacent guideways of adjacent guide means is equal to the spacing between said sets of rollers, a carriage elevator associated with each guide means, and means for moving the carriages along the tracks.

2. A parking system as defined in claim 1 characterized further in that each carriage elevator comprises an endless chain extending through the respective loop, a plurality of roller supporting steps secured on the chain and spaced apart a distance equal to the spacing between vertically adjacent tracks, and means for driving the chain around the loop.

3. A parking system as defined in claim 1 characterized further in that each set of tracks is in the form of opposed channel-shaped members arranged with the open sides of the channels facing inwardly to receive the respective rollers, and said guide means are in the form of inwardly facing channel members to form the roller guideways, the vertically extending channel members of each guide means being spaced apart, whereby a section of each track intersected by a given guide means extends between said members to receive carriage rollers.

4. A parking system as defined in claim 1 characterized further in that said means for moving the carriages along the tracks comprises a rack on at least one side of each carriage extending parallel to the tracks, a plurality of gears carried by each set of tracks arranged to mesh with said racks, and power means for turning said gears.

References Cited in the file of this patent

UNITED STATES PATENTS

| 1,458,881 | Gromer | June 12, 1923 |
| 1,584,212 | Burrell | May 11, 1926 |
| 1,852,633 | Ziebarth | Apr. 5, 1932 |
| 2,569,393 | Walker | Sept. 25, 1951 |
| 2,761,572 | Baker, Sr. | Sept. 4, 1956 |

FOREIGN PATENTS

| 717,018 | Great Britain | Oct. 20, 1954 |